United States Patent [19]

Schjerven et al.

[11] Patent Number: 5,400,838
[45] Date of Patent: Mar. 28, 1995

[54] AUTOMATIC PACKAGING METHOD AND APPARATUS

[75] Inventors: William N. Schjerven, Mt. Prospect; Ramojus P. Vaitys, Highland Park, both of Ill.

[73] Assignee: Gas Research Institute, Chicago, Ill.

[21] Appl. No.: 181,021

[22] Filed: Jan. 14, 1994

[51] Int. Cl.⁶ .................... B65B 43/42; B67C 3/00
[52] U.S. Cl. ........................ 141/174; 141/168; 141/129; 141/82; 141/144; 53/253; 53/473; 221/5
[58] Field of Search .................... 141/174, 97, 98, 1, 141/83, 82, 168, 171, 172, 176, 144; 53/244, 248, 250, 444, 148, 236, 253, 473; 221/5

[56] References Cited

U.S. PATENT DOCUMENTS

| | | |
|---|---|---|
| 18,043 | 8/1857 | Fowler . |
| 1,037,552 | 9/1912 | Shea . |
| 1,485,187 | 2/1924 | Hodgdon . |
| 1,785,570 | 12/1930 | Wollny . |
| 1,963,621 | 6/1934 | Geyer . |
| 2,467,995 | 4/1949 | Schlechter . |
| 2,668,649 | 2/1954 | Clark et al. . |
| 3,104,780 | 9/1963 | Carter et al. . |
| 3,369,479 | 2/1968 | Oppenheimer et al. . |
| 3,448,677 | 6/1969 | Dexters . |
| 3,866,641 | 2/1975 | Mizu et al. . |
| 3,875,982 | 4/1975 | Mizu et al. . |
| 4,009,740 | 3/1977 | Michielli ........................ 141/172 |
| 4,094,439 | 6/1978 | List . |
| 4,174,742 | 11/1979 | Murphey . |
| 4,226,269 | 10/1980 | Carr et al. . |
| 4,359,935 | 11/1982 | Murray . |
| 4,505,193 | 3/1985 | Mariotti . |
| 4,628,974 | 12/1986 | Meyer ........................... 141/168 X |
| 4,646,627 | 3/1987 | Bartfield et al. . |
| 4,722,267 | 2/1988 | Galockin et al. . |
| 4,738,290 | 4/1988 | Ciekanski ...................... 141/82 |
| 4,748,902 | 6/1988 | Maurantonio . |
| 4,807,780 | 2/1989 | Parsons et al. ................ 141/174 X |
| 4,838,455 | 6/1989 | Hoeberigs . |
| 4,843,795 | 7/1989 | Shroyer . |
| 4,922,435 | 5/1990 | Cahlander et al. . |
| 4,944,337 | 7/1990 | Credle, Jr. et al. ............ 141/174 |
| 4,945,826 | 8/1990 | Ripatonda . |
| 4,955,178 | 9/1990 | Shroyer . |
| 4,965,984 | 10/1990 | Farnsworth et al. . |
| 4,967,808 | 11/1990 | Credle, Jr. et al. ............ 141/9 |
| 4,971,120 | 11/1990 | Credle, Jr. et al. ............ 141/174 |
| 5,000,345 | 3/1991 | Brogna .......................... 221/5 |
| 5,058,630 | 10/1991 | Wiley et al. ................... 141/1 |
| 5,074,341 | 12/1991 | Credle, Jr. et al. ............ 141/1 |
| 5,282,498 | 2/1994 | Cahlander ..................... 141/168 X |

FOREIGN PATENT DOCUMENTS

974388 11/1964 United Kingdom .

Primary Examiner—Ernest G. Cusick
Attorney, Agent, or Firm—Hill, Steadman & Simpson

[57] ABSTRACT

An automatic packaging machine is provided which has a chute for directing objects such as cooked french fries into the interior of a rotatable loading drum. The drum is rotated by a motor about a horizontal axis at a speed to cause the french fries to first be carried upwardly and then to fall through a predetermined path within the drum. A staging carousel is provided for carrying a supply of varying sized packaging containers such as cups. The carousel can be rotated to a dispensing position where a single selected size container will be dispensed to an index carousel. The index carousel will move the container to a position within the drum to intercept the falling french fries to fill the container. A detector is provided for sensing when the container has been filled. Once the container is filled it is moved via various transfer mechanisms to a deposit or storage area which can accommodate a plurality of containers and has a mechanism for clearing space to receive additional containers.

33 Claims, 7 Drawing Sheets

AUTOMATIC PACKAGING METHOD AND APPARATUS

BACKGROUND OF THE INVENTION

The present invention relates to an automatic packaging method and apparatus, and more particularly to an automatic method and apparatus for packaging objects such as cooked french fries.

A number of devices have been patented for dispensing french fries or other similar food products in which various means are provided to meter out a desired amount of the food items particularly for cooking only a single order and then packaging that single order. Many of the prior devices are limited to single sized portions or dispense only a single container until that container has been manually removed.

It would be an advantageous development in the art if an apparatus and method were provided for automatically dispensing pre-cooked french fries into a selected sized container, from a variety of available sizes, and, after said container has been filled, moving the container to a storage area which can accommodate a plurality of filled containers.

SUMMARY OF THE INVENTION

The present invention provides a method and apparatus for selecting and filling various sized containers with objects such as french fries, and, when filled, it automatically moves the containers to a receiving area which can accommodate a plurality of filled containers. Thus, multiple orders of varying sizes can be filled automatically.

An apparatus for carrying out this invention is a stand alone, self contained unit which has a rotatable dispensing drum for receiving and dispensing the precooked french fries into containers. One or more receiving chutes are arranged to permit precooked french fries to be loaded into the drum, even as it rotates. The drum is equipped with a sensor to terminate operation when the drum no longer has a supply of french fries.

A staging carousel is provided which carries a plurality of different sized containers. The staging carousel acts in response to input signals which may come from an input device, such as a cash register, wherein container size and quantity information is input to a control unit. The control unit then operates the staging carousel to position the correctly sized container at an unstacking station so that a single package, such as a cup, can be removed from a stack of like sized containers.

The container is then directed to a rotatable indexing carousel which moves the container into an interior of the rotating drum. The drum is rotated about a horizontal axis at a speed to cause the french fries to be carried upwardly with the drum for a certain distance and then to fall along a predetermined path. The container is positioned in this path by the indexing carousel and thus receives a supply of french fries. A sensor is provided to determine when the container has been filled.

Once filled, the container is moved by the indexing carousel to a transfer position where it is engaged by a transfer mechanism to move it from the indexing carousel to a deposit area. Preferably the transfer mechanism includes an arm which reciprocates vertically and pushes and carries the container to an elevated position. At this elevated transfer position a mechanism is provided to horizontally move the filled container from the elevated transfer position to the deposit area. In a preferred embodiment, reciprocal grasping arms are used to capture the container at the elevated transfer position and move it into the deposit area.

Further, conveying means are provided in the deposit area to move deposited filled containers to accommodate receipt of subsequent containers in the deposit area.

Thus, once orders for packaged french fries have been input at the input terminal, the remainder of the operation including automatically selecting the appropriately sized container, automatically moving the container to an area where it is filled, and automatically moving the filled container to a deposit area which can accommodate a plurality of such containers, is provided by this invention.

DETAILED DESCRIPTION OF THE PREFERRED EMBODIMENTS

Although the present invention is directed to an automatic packaging method and apparatus which can be used to package a wide variety of objects, it finds particular utility in the packaging of cooked french fries and, for purposes of disclosing an embodiment of the invention, cooked french fries will be used as the packaged objects.

Figure 1:
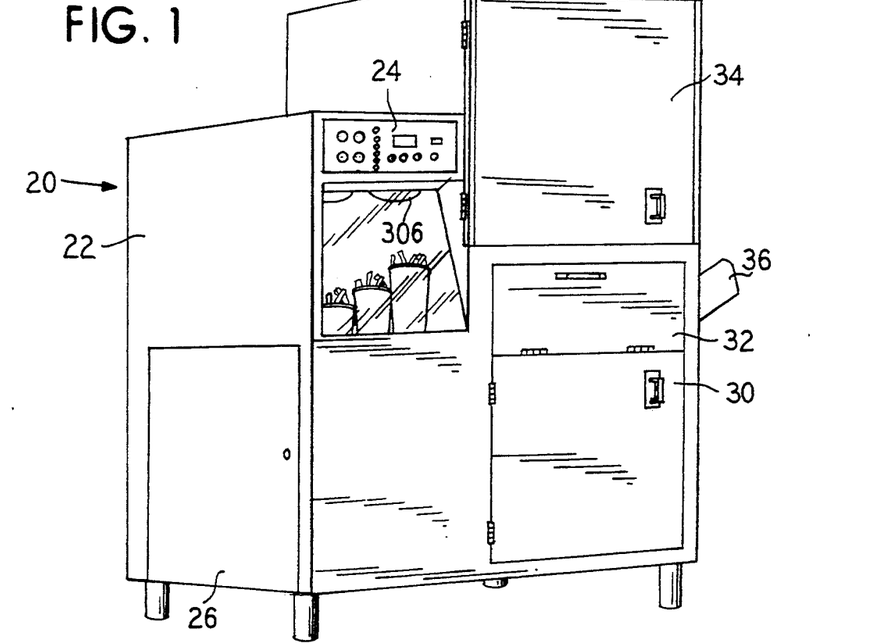
FIG. 1 is a perspective view of an apparatus for automatically packaging french fries in accordance with the present invention.
Figure 2:
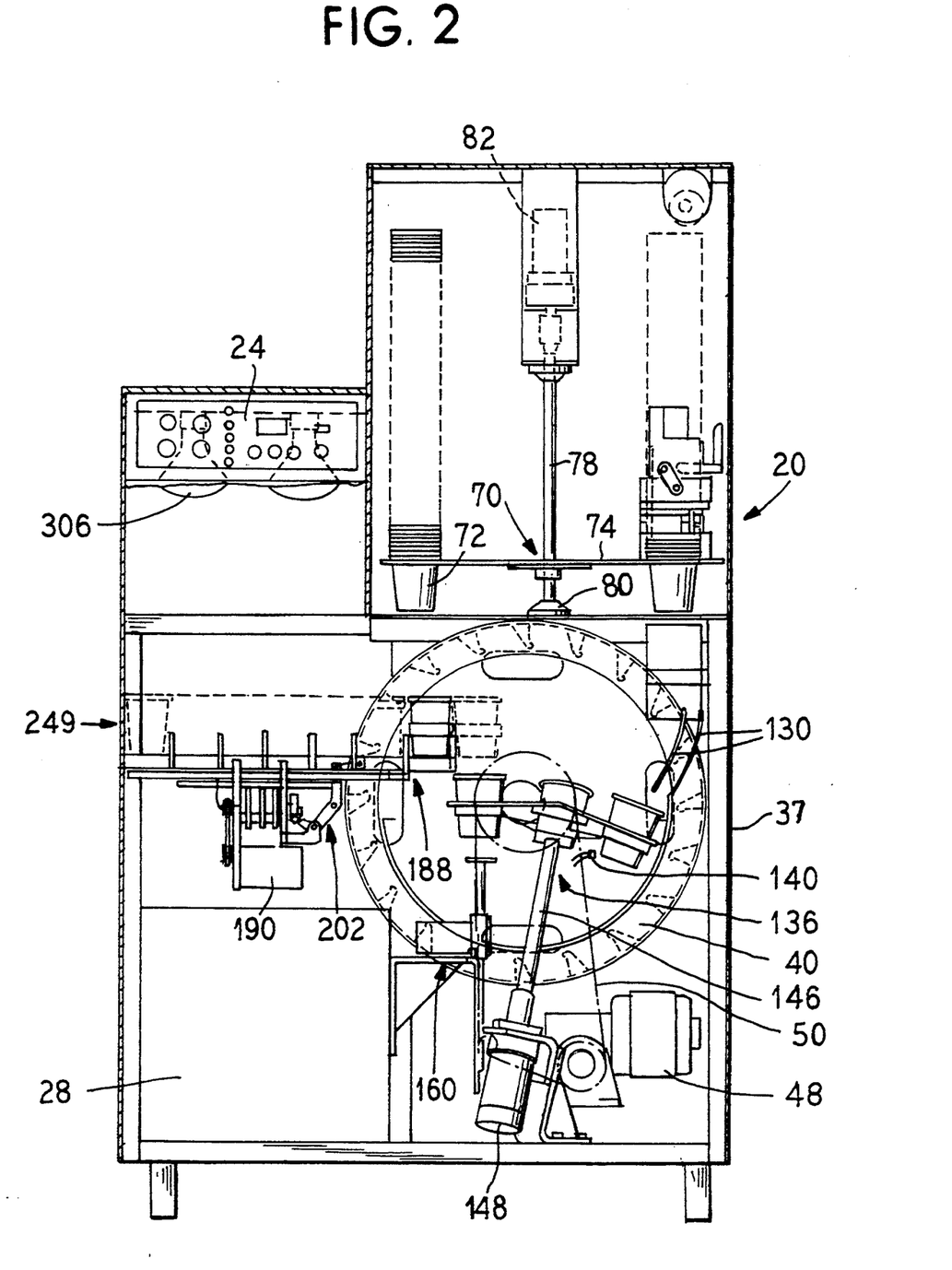
FIG. 2 is a front view of the device of FIG. 1 with the cabinetry removed to display certain interior components.

An apparatus for automatically dispensing french fries is illustrated generally at 20 in FIGS. 1 and 2. The device 20 has an outer cabinet 22 with a number of doors providing access to various compartments within the cabinet as will be described below. A control panel 24 is provided on the cabinet 22 which can be utilized to provide various input information including container size, number of containers to be filled, and an emergency stop signal, as well as various output information in the form of visual or auditory signals indicator lights or buzzers for indicating status of various components of the device 20.

A first door 26 provides access to a storage area 28 in which various supplies such as extra containers can be kept. A pair of doors 30, 32 provide access to an interior portion of the device where containers are filled with french fries as discussed below. Another door 34 provides access to a cup staging carousel where cups or other containers are held awaiting selection and movement to the filling area.

Figure 4:
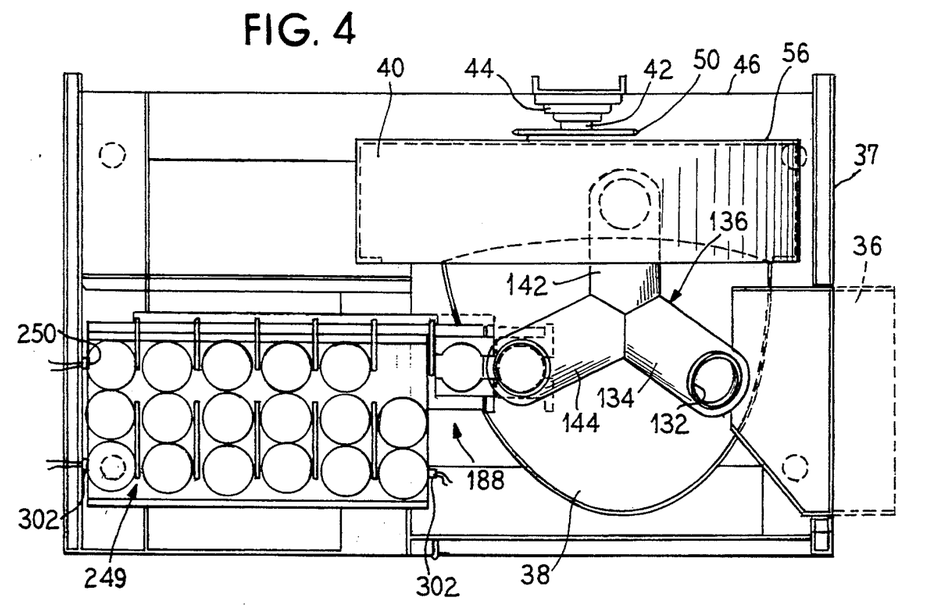
FIG. 4 is a plan view of a portion of the interior of the packaging apparatus.

The device 20 has an inlet chute 36 which directs french fries 35 through an opening in a side wall 37 of the cabinet 22 and onto a curved chute 38 (FIG. 4) which causes the french fries to be directed into the interior of a rotatable drum 40. The drum 40 is carried on a horizontal axis 42 which is cantilevered from a bearing 44 secured to a rear wall 46 of the cabinet 22. A motor 48 drives a belt 50 to rotate the drum 40.

The drum 40 has a plurality of paddles or flights 52 (FIG. 3) which extend essentially parallel to the horizontal axis and define a number of pockets 54 within which the french fries 35 are carried as the drum rotates. The flights 52 are configured so as to lift and carry the french fries around a portion of the circumference of the drum 40 as it rotates and to release the french fries to permit them to fall in an arcuate path back toward a lowermost portion of the drum.

Figure 3:
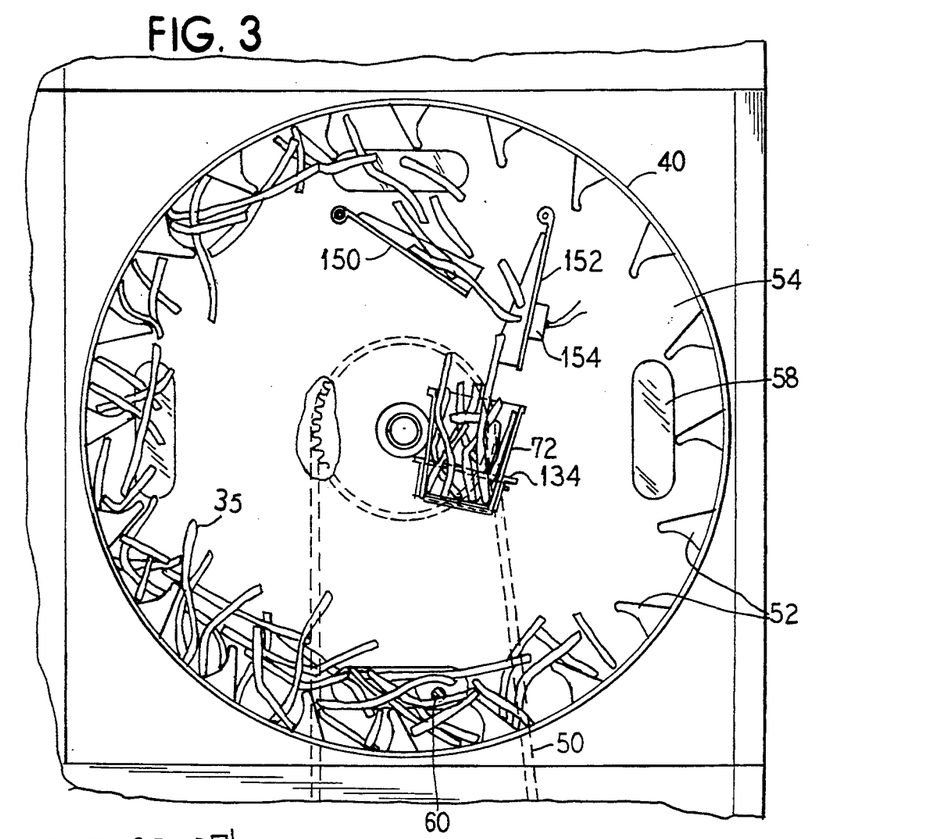
FIG. 3 is a front elevational view of a french fry dispensing drum.
Figure 5:
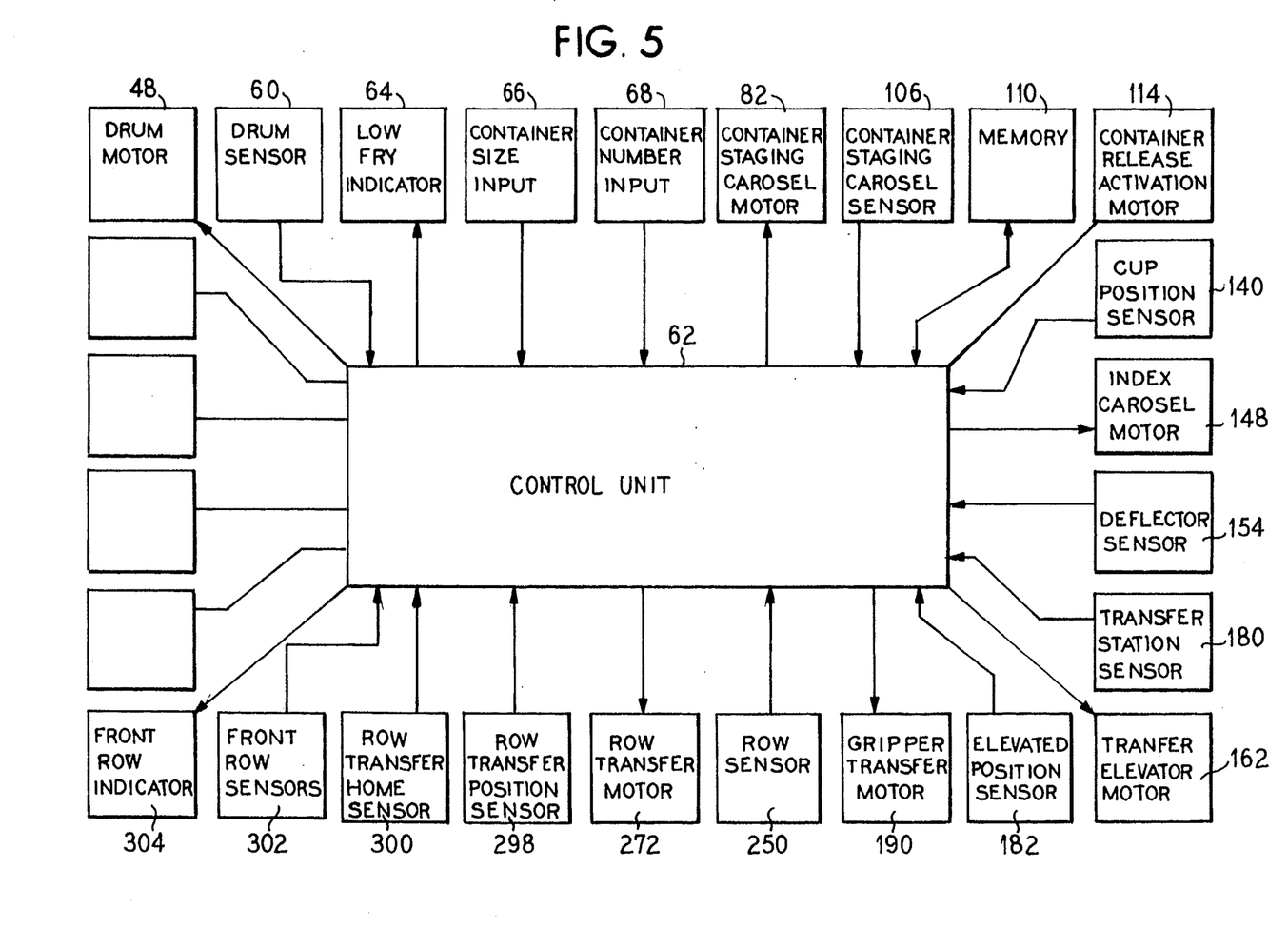
FIG. 5 is a schematic control element and control unit diagram.

A rear wall 56 of the drum 40 is provided with a plurality of windows 58 positioned adjacent to the flights 52. A sensor 56 is positioned outside of the drum 40 behind a rear wall 56 thereof and at a lowermost position of the windows 58. When the sensor 60 no longer detects the presence of any french fries through the window 58 as it passes the lowermost point of travel for the drum, an appropriate signal is sent back to a control unit 62 (FIG. 5) which in turn will send an appropriate signal to terminate operation of the drum motor 48. A signal may also be sent to a low fry indicator 64 which may be an indicator light, buzzer or other type of signaling device which may be mounted on the control panel 24.

To initiate a filling operation an operator needs to input information relating to desired container size through a container size input device 66 (FIG. 5) which may be on control panel 24 or may be part of a cash register system. Also, information relating to the number of containers desired to be filled must be input through a container number input device 68 which similarly may be located on the control panel 24 or may be part of a cash register system. This information is input to the control unit 62.

Figure 6:
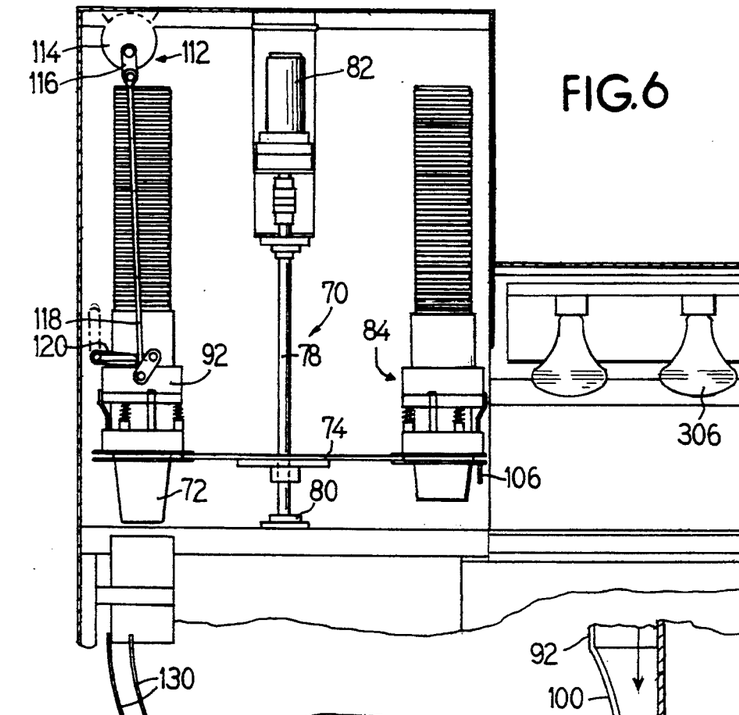
FIG. 6 is an elevational view of a cup staging and dispensing device.
Figure 7:
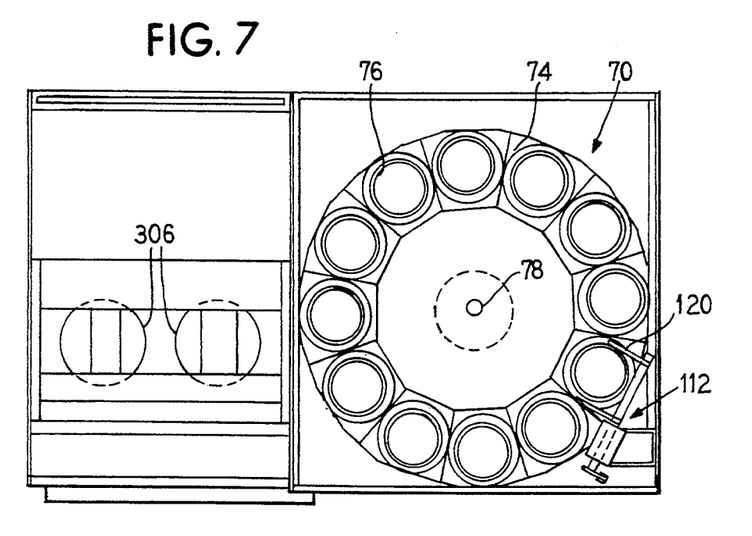
FIG. 7 is a plan view of the cup staging carousel of FIG. 6.

The device 20 includes a container staging carousel 70 illustrated in FIGS. 2, 6 and 7 which is located behind door 34. In the embodiment illustrated, the containers comprise cups 72 which are carried in a plurality of stacks, each stack having a common size. The carousel 70 has a platter 74 with a series of apertures 76 angularly spaced around the peripheral portion of the platter 74, which apertures 76 are sized to allow passage of the cups 72. The platter 74 is secured to a vertical axle 78 which is rotatably carried at a lower end in a bearing 80 and is connected at an upper end to a container staging carousel motor 82. Rotation of the motor drive shaft will result in rotation of the platter 74.

Figure 8:
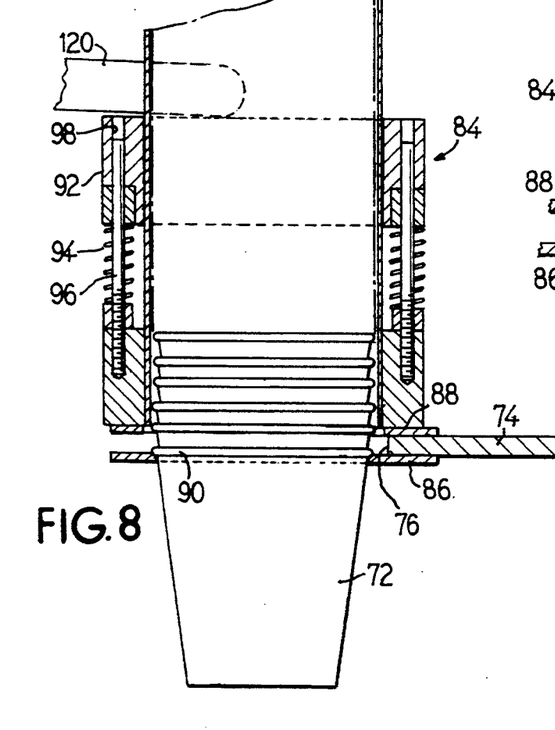
FIG. 8 is a partial side sectional view of the cup dispensing apparatus.
Figure 9:
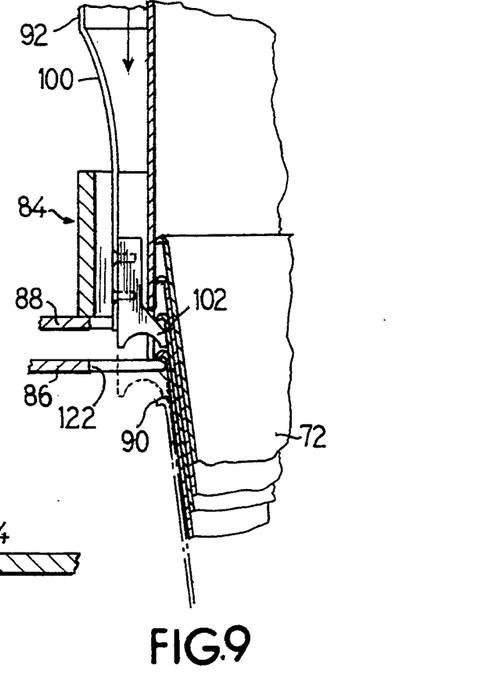
FIG. 9 is a partial side sectional view of the cup dispensing apparatus of FIG. 8.

A dispensing mechanism 84 is mounted on the platter 74 overlying each of the apertures 76. The dispensing mechanism 84 is shown in greater detail in FIGS. 8 and 9. A pair of lower rings 86, 88 are attached to the platter 74 adjacent each aperture 76. An inside diameter of the lowermost ring 86 is sized so as to retain a lip 90 at the top of the cup 72. Thus, the lowermost cup 72 will be prevented from falling downwardly through the lowermost ring 86. An upper ring 92 is positioned above the rings 86, 88 and is biased upwardly by a spring 94 carried on a guiding pin 96 extending vertically through a passage 98 in the ring 92. The ring 92 thus is reciprocable toward and away from the stack of cups 72 held by the ring 86. The ring 92 has a plurality of extension members 100 extending downwardly therefrom which each terminate in a finger 102 which overlies the lip 90 of the lowermost cups when the ring 92 is in the elevated position.

When the control unit 62 receives an input for filling a container, a signal is sent out to energize the container staging carousel motor 82 causing it to rotate the platter 74 and the stack of cups 72 carried on the platter. A container staging carousel position sensor 106 is used to detect the angular position of the platter 74 and it sends an appropriate signal to the control unit 62 to control the rotation of the staging carousel 70. The various sizes and positions of the containers in the carousel 70 are previously stored in a memory 110 thus permitting the control unit 62 to control the position of the carousel platter 74 to move an appropriate stack of containers to a preselected angular position.

At one pre-selected angular position of the carousel platter 74 there is positioned a release activation mechanism 112 which includes a container release activation motor 114 having an output drive shaft connected to a crank 116. The crank 116 is pivotally connected to an elongated arm 118 which in turn is connected to rotate a pair of fingers 120 which overlie the upper ring 92. To release a container, the control unit 62 sends an appropriate signal to the container release activation motor 114 causing it to cycle through one revolution which, by operation of the cranks and arms, causes fingers 120 to make a one time depression against the ring 92. As the ring 92 is pressed downwardly against the bias of springs 94, the finger 102 passes through an aperture 122 in the lower ring 86 and pushes the lip 90 of the lowermost cup 72 past the ring 86, thereby releasing it to fall downwardly.

The next cup in the stack is captured by the ring 86 and is prevented from falling downwardly. As the fingers 120 move back upwardly, releasing downward pressure on the upper ring 92, the upper ring also moves upwardly drawing its extension members 100 and fingers 102 upwardly. An upper surface of the finger 102 is angled downwardly. Since the finger 102 is cantilevered on the end of arm 100 (which acts as a spring to bias the fingers 102 toward the cups 72), the finger 102 is free to be urged away from the lip 90 as it moves upwardly, thus allowing the finger 102 to move up past the lip to a position above the top of the new lowermost cup rim.

The released cup 72 falls downwardly under the force of gravity and engages a pair of rails 130 which guide the cup toward an aperture 132 in an arm 134 of an index carousel 136 (FIGS. 2 and 6). A cup position sensor 140 is provided adjacent to the aperture 132 to send a signal back to the control unit 62 confirming that a cup 72 has been properly received in the index carousel. The carousel 136 has three arms 134, 142 and 144 (FIGS. 2 and 4) spaced 120° apart and the arms are carried on the end of a rotatable shaft 146 so that the arms can be rotated into different angular positions. An index carousel motor 148 is connected to the shaft 146 to provide the desired rotation.

Once the control unit 62 has received the input from the cup position sensor 140 that a cup has safely arrived into the aperture 132, a signal is sent from the control unit 62 to energize the index carousel motor 148 to step it through 120° of rotation. When this is done, the arm 134 moves into the position shown occupied by arm 142 in FIG. 4, that is, the arm extends into the interior of the drum 40. The cup 72 is positioned by the arm 134 so as to be in a path of the french fries which are tumbling within the drum 40 as shown in FIG. 3.

In the embodiment illustrated in FIG. 3, two deflectors 150, 152 are provided to direct the falling french fries into the cup 72. The second deflector 152 is positioned above the opening of the cup and it includes a deflector sensor 154, preferably a capacitive sensor, which can sense when the french fries are piled up onto the second deflector 152. When this occurs, a signal is sent from the deflector sensor 154 to the control unit 62 indicating that the cup 72 is full.

Figure 10:
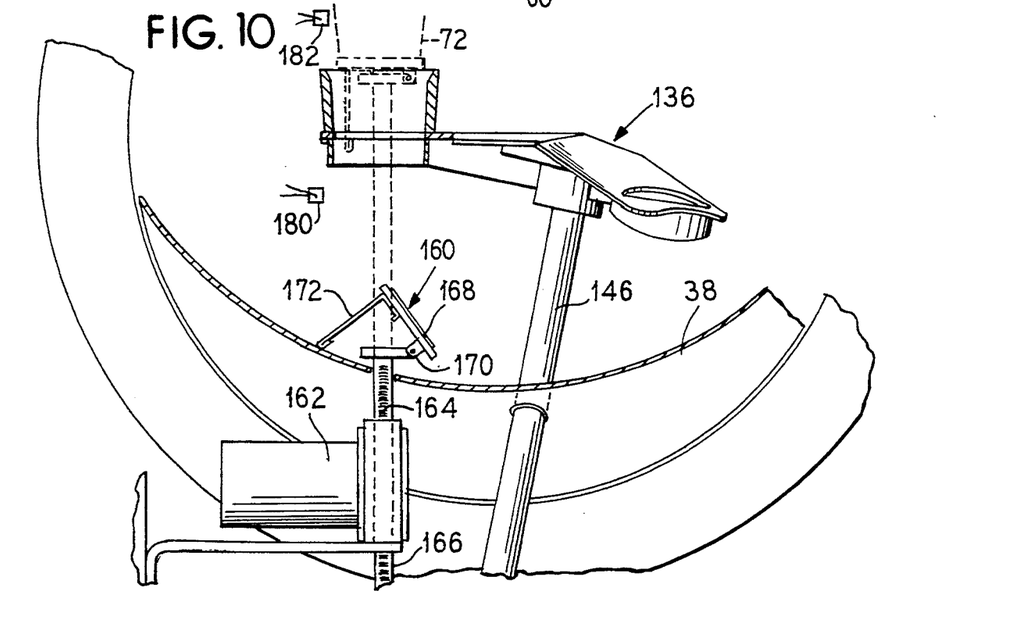
FIG. 10 is a partial side sectional view of a cup indexing carousel and first transfer mechanism.

Once the cup 72 is sensed to be full, the index carousel motor 148 is again energized to cause the arms to rotate an additional 120°. When this occurs, arm 134 is then cycled to the position occupied by arm 144 in FIG. 4, sometimes referred to as a transfer station. In this position a transfer mechanism 160 (FIGS. 2 and 10) is provided to transfer the full cup from the index carousel 136 to a storage area. The transfer mechanism 160 includes a transfer elevator motor 162 carrying a pinion (not shown) on its drive shaft which meshes with a toothed rack 164 carried on a vertically oriented rod 166. At the end of the rod is a plate 168. The plate 168 is pivotally attached at 170 to a top end of the rod 166 and the plate includes a downwardly extending finger 172 which engages the curved chute 38 to tip the plate 168 when the rod 166 is in a lowermost position. This prevents any dislodged french fries from laying on the upper surface of the plate 168.

A transfer station sensor 180 is provided adjacent to the index carousel arm aperture position at the transfer station and, when the index carousel 136 moves a cup 72 to the transfer station position, the transfer station sensor 180 will be satisfied and will send an appropriate signal to the control unit 62 to indicate that a cup is in position. This will cause the control unit 62 to send a signal to energize the transfer elevator motor 162 to cause the plate 168 to move upwardly (and therefore pivot into a horizontal position) to engage the bottom side of the cup 72 to release it upwardly from the index carousel 136 and to hold it in an elevated transfer position. An elevated position sensor 182 can be provided either at an elevated position to sense the arrival of the cup at the elevated position or it can be associated with the rod 166 to detect its elevated position. This sensor 182 is provided to send a signal to the control unit 62 to indicate that the cup 72 has arrived at the elevated transfer position. At that position another transfer mechanism 188 is provided which is shown in greater detail in FIGS. 2, 4 and 11–15.

Figure 11:
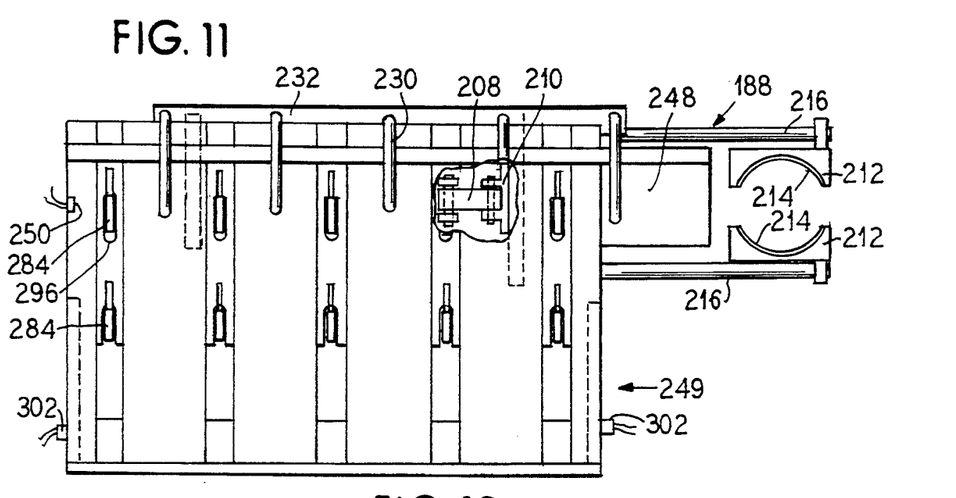
FIG. 11 is a plan view of a second transfer mechanism.
Figures 12, 13:
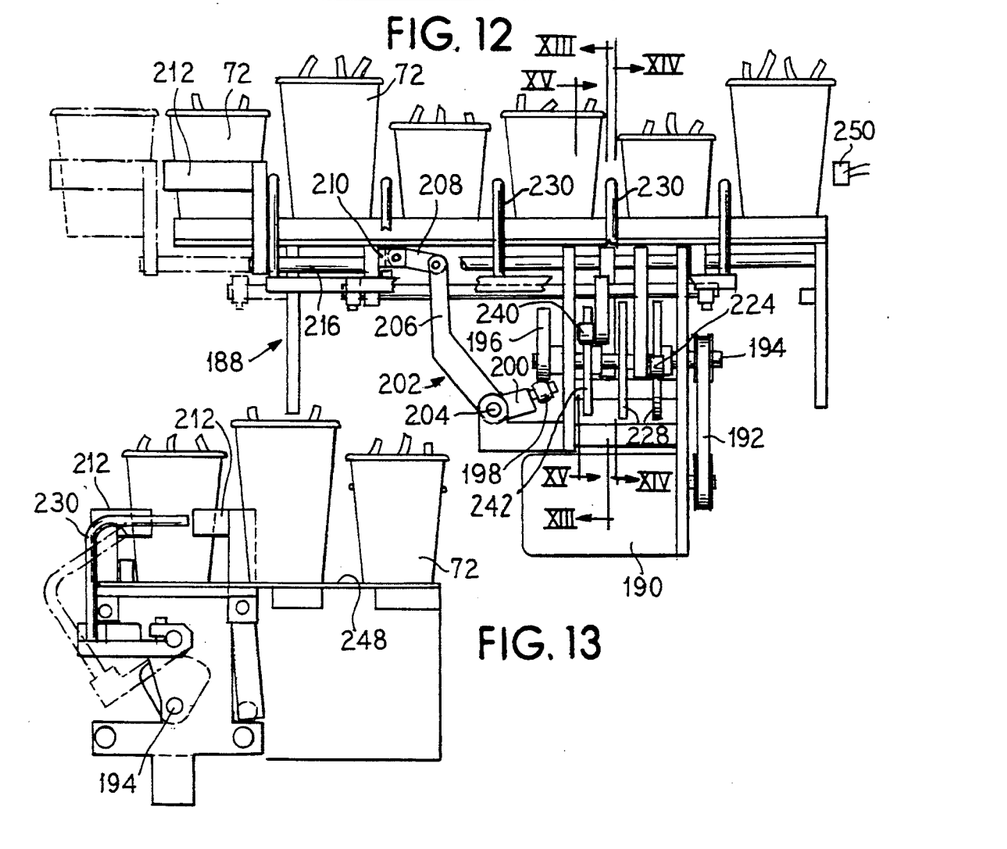
FIG. 12 is a side elevational view of the second transfer mechanism of FIG. 11.
FIG. 13 is a partial end elevational view of the second transfer mechanism.
Figure 14:
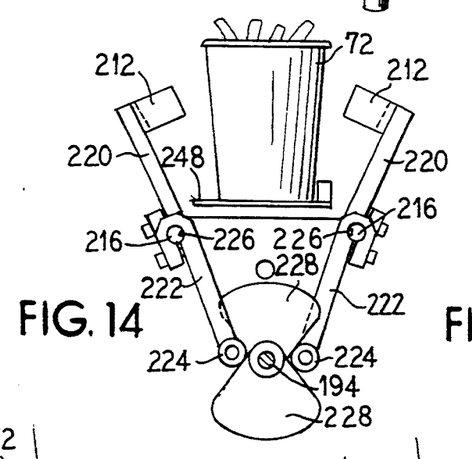
FIG. 14 is an end view of a gripper portion of the second transfer mechanism.
Figure 15:
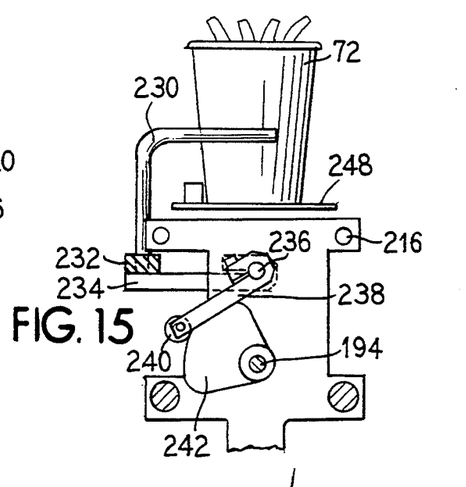
FIG. 15 is an end sectional view of a portion of the second transfer mechanism.

The second transfer mechanism has a motor (gripper transfer motor) 190 which is connected by means of a drive belt 192 to a shaft 194. Carried on the shaft 194 is a first cam 196 which engages a roller 198 carried at the end of a leg 200 of a crank 202. The crank is pivoted at 204 and has a second, longer leg 206 which is pivotally connected to a link 208 which in turn is pivotally connected to a frame 210 of the transfer mechanism 188.

A pair of gripper members 212 having inwardly facing arcuate surfaces 214 are carried on rod members 216 which move with the frame 210. The rods 216 are journaled to slide relative to a first connecting arm 220 connecting the shaft 216 to the gripper members 212 as well as to a second arm 222 which connects the shaft 216 to a cam follower 224. The rod 216 slides within the connection to a second arm 222 but is securely fixed to the first arm 220. An anti-rotation means 226 prevents the rod 216 from rotating relative to the second arm 222 as it slides therethrough.

The cam followers 224 ride on the outer surface of cams 228 which rotate with shaft 194. As the cams 228 are rotated by the shaft 194 the arms 222 are caused to swing inwardly and outwardly causing the gripper members 212 to also swing inwardly and outwardly.

The frame 210 also carries a plurality of pusher fingers 230 which are spaced along a length of the frame by a connecting bar 232 such that the fingers 220 are spaced apart a distance slightly larger than a diameter of the cups 72. The connecting bar 232 is connected by an arm 234 to a shaft 236. The shaft in turn is slidingly received in an arm 238 which is connected to a cam follower 240. The cam follower 240 rides on an outer surface of cam 242 which is also carried to corotate with shaft 194.

The second transfer mechanism operates as follows. When the elevated position sensor 182 has sent the appropriate signal to the control unit 62, the control unit will send a signal to begin operation of the gripper transfer motor 190. This will cause rotation of shaft 184, causing rotation of cam 196, to result in a rocking movement of crank arm 202, causing the frame to move from its retracted position to an extended position. As this occurs, cams 228 are also rotated causing the second arms 222 to swing inwardly and the first arms 220 to swing outwardly thus opening the jaws of the gripper members 212. Thus, when the gripper members 212 arrive at the extended position, they will be held open. Also at this time cam 242 rotates causing the pusher fingers to pivot outwardly (as shown in phantom in FIG. 13) to move out of contact with the cups 72 to allow the finger members to be advanced to a position in between the next cup in line. When the frame 210 is in its fully advanced position, the cams 228 cause the gripper members 212 to move toward one another to engage around a cup 72 held at the elevated transfer position by the first transfer mechanism 160. The cam 196 has a small diameter dwell portion to prevent retraction of the frame 210 until after the gripper members 212 have engaged the cup. Also, the pusher fingers 230 will be rotated back into an interfering position between adjacent cups. As the cam 196 continues to rotate, the frame is retracted causing the cup 72 captured by the grippers 212 to be moved away from the elevated position and to be placed on a shelf 248 positioned above the frame 210 forming part of a storage area 249. The pusher fingers 230 will push other cups 72 along the shelf 248 to make room for the new cup being brought in from the elevated transfer position. Once the frame 210 has completely retracted, the cams 228 and 242 cause the grippers 212 and fingers 230 to again pivot open and then operation of the motor is terminated until a new cycle signal is received from the control unit 62.

Figure 16:
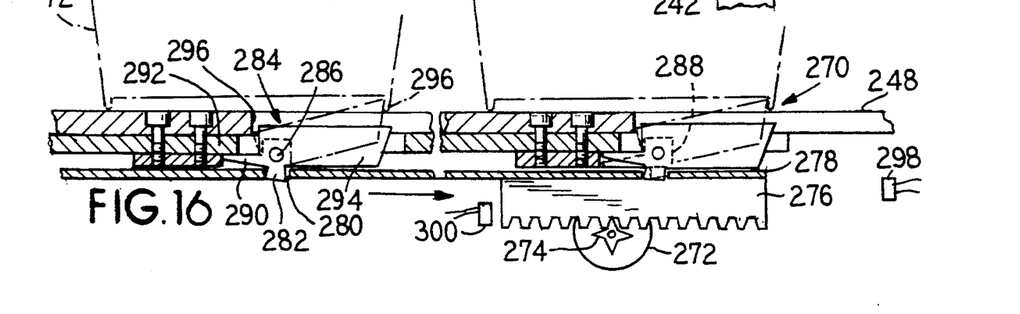
FIG. 16 is a partial sectional view of a mechanism for moving filled cups in a deposit area.

A row sensor 250 is positioned adjacent to an end of a rear row in the storage area 249. When the row sensor 250 detects the presence of a cup, this will signify that the back row has been filled, thus initiating a row transfer operation. A transfer mechanism 270 is illustrated in FIG. 16. This mechanism includes a row transfer motor 272 which receives an operating signal from the control unit 62 following receipt of the signal from the row sensor 250. The row transfer motor 272 has a pinion 274 carried on its drive shaft which meshes with a toothed rack 276 which, in turn, carries a plate 278. The plate 278 extends beneath the receiving area 252. The plate 278 has a plurality of apertures 280 therethrough for receiving an arm 282 of a crank 284. The crank 284 is pivotally mounted at 286 to a block 288 which is free to slide relative to the plate 278. The crank 284 has a rearward extending arm 290 which is pivotable between engagement with the plate 278 and engagement with an upper stop member 292. The crank 284 also has a forwardly extending arm 294 which, in a lower position rests against the plate 278 and, in an upper position, projects above an opening 296 through the shelf 248.

When the row transfer motor 272 is energized in response to a full row signal, the pinion 274 rotates counter clockwise as shown in FIG. 16 to move the rack 276 and plate 278 to tile right. This causes an edge of the opening 280 to engage against the finger 282 of the crank 284 to cause the crank to pivot counter clockwise and to cause the second arm 294 to raise up into a position beneath a cup 72 to interfere with a lower lip 296 of the cup. As the rack 276 continues to move to the right, the arm 294 of the crank will cause the cup 72 to be slid along the upper surface of the shelf 248 moving an entire row of cups into the next forward row position. When the row transfer mechanism has moved to the next row position, as may be detected by a row transfer position sensor 298, the control unit 62 will cause the row transfer motor 272 to reverse its operation causing the right hand edge of the opening 280 to engage the finger 282 of the crank to rotate it in a clockwise direction making it move into a recessed position relative to the shelf surface 248. The rack 276 will then be moved to the left moving the transfer mechanism back to its initial home position. This home position may also be detected by a row transfer home sensor 300 which will send a signal to the control unit 62 to terminate operation of the row transfer motor 272.

A pair of front row sensors 302 are provided at opposite ends of the front row to detect whether there are any cups 72 positioned in the front row. These sensors 302 send a signal to the control unit 62 if there is a cup 72 in the front row which will prevent further operation of the packaging apparatus 20 upon receipt of a signal from the row sensor 250 indicating that the rear row has also been filled. This will prevent operation of the row transfer mechanism 270 which might otherwise push one or more cups 72 off of the front row of the storage area 249. When the rear row has been filled and a cup 72 is present in the front row, the control unit 62 may send a signal out to an indicator device such as a buzzer to indicate that the storage area may be filled. It may also be that although the front row has a cup in it, other rows having missing cups which will permit a manual redistribution of the cups in the storage area 249 to permit continued operation of the packaging apparatus.

It is also preferred to provide heating elements, such as heating lamps 306 in the storage area 249 to maintain the french fries in an elevated temperature condition until they are removed from the storage area.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

I claim as my invention:

1. An automatic packaging machine comprising:
   a rotatable loading drum;
   chute means for directing objects to be packaged to said rotatable loading drum;
   means for rotating said drum about a horizontal axis at a speed to cause said objects to first be carried upwardly and then to fall through a predetermined path;
   means for carrying a supply of varying sized packaging containers;
   means for selecting a particular sized packing container;
   means for positioning said selected container in said path of falling objects to fill said container;
   means for detecting when said container is filled;
   means for moving said filled container to a transfer station;
   means for moving said filled container from said transfer station to a deposit area; and
   means for moving filled containers in said deposit area to make space for receiving additional containers.

2. An automatic packaging machine according to claim 1, wherein said chute means comprises a first angled member leading from an opening in a side wall of said machine to a second curved chute shaped to funnel said objects downwardly and rearwardly into said drum.

3. An automatic packaging machine according to claim 1, wherein said means for rotating said drum comprises a motor connected to said drum by means of a connecting belt.

4. An automatic packaging machine according to claim 1, wherein said drum includes a plurality of flights to carry said objects arcuately upwardly and then to release them to fall downwardly.

5. An automatic packaging machine according to claim 1, wherein said means for carrying a supply of containers comprises a staging carousel rotatable around a vertical axis, said carousel having stations therein for holding a plurality of stacks of various sized containers, with each stack having a plurality of single sized containers.

6. An automatic packaging machine according to claim 5, wherein said means for selecting a particular sized container comprises detectors for stopping said carousel at a particular angular position to position a desired stack of containers at an unstacking station, and means at said unstacking station for withdrawing a single container from said desired stack.

7. An automatic packaging machine according to claim 1, wherein said means for positioning said selected container in said path comprises an indexing carousel for carrying said selected container into said path.

8. An automatic packaging machine according to claim 1, wherein said means for detecting when said container is filled comprises a capacitive sensor positioned above a top of said container to determine the presence of objects piled above the top of said container.

9. An automatic packaging machine according to claim 1, wherein said means for moving said filled container to a transfer station comprises an indexing carousel.

10. An automatic packaging machine according to claim 1, wherein said means for moving said filled container from said transfer station comprises a lifter mechanism to engage said container and lift it away from said means for moving said container to said transfer station.

11. An automatic packaging machine according to claim 1, wherein said means for moving said filled container to said deposit area comprises a pair of pivotable arms having a grasping portion designed to engage said container and to carry it to said deposit area.

12. An automatic packaging machine according to claim 1, wherein said means for moving filled containers in said deposit area comprises a transfer mechanism having a portion for engaging said containers to slide them toward an unoccupied portion of said deposit area.

13. A french fry packaging machine comprising:
a rotatable drum;
means for loading cooked french fries into said rotatable drum;
means for rotating said drum about a horizontal axis at a speed to cause said french fries to first be carried upwardly and then to fall through a predetermined path;
means for automatically selecting a container and positioning said container in said path of french fires to fill said container;
means for detecting when said container is filled; and
means for moving said filled container to a deposit area.

14. A french fry packaging machine according to claim 13, wherein said drum includes a plurality of flights to carry said french fries arcuately upwardly and then to release them to fall downwardly.

15. A french fry packaging machine according to claim 13, wherein said means for carrying a supply of containers comprises a staging carousel rotatable around a vertical axis, said carousel having stations therein for holding a plurality of stacks of various sized containers, with each stack having a plurality of single sized containers.

16. A french fry packaging machine according to claim 15, wherein said means for selecting a particular sized container comprises detectors for stopping said carousel at a particular angular position to position a desired stack of containers at an unstacking station, and means at said unstacking station for withdrawing a single container from said desired stack.

17. A french fry packaging machine according to claim 13, wherein said means for positioning said selected container in said path comprises an indexing carousel for carrying said selected container into said path.

18. A french fry packaging machine according to claim 13, wherein said means for detecting when said container is filled comprises a capacitive sensor positioned above a top of said container to determine the presence of french fries piled above the top of said container.

19. A french fry packaging machine according to claim 13, further including means for moving filled containers in said deposit area to make space for receiving additional containers.

20. A system for automatically dispensing objects comprising:
an input terminal for inputting information relating to a desired order for packaged objects;
a rotatable loading drum;
means for loading said objects to said rotatable loading drum;
means for rotating said drum about a horizontal axis at a speed to cause said objects first be carried upwardly and then to fall through a predetermined path;
means for automatically selecting a container in response to said input information;
means for positioning said selected container in said path of said falling objects to fill said container;
means for detecting when said container is filled;
means for moving said filled container to a deposit area.

21. A packaging machine comprising:
a rotatable drum;
means for loading objects to be packaged into said rotatable drum;
means for rotating said drum about a horizontal axis at a speed to cause said objects to first be carried upwardly and then to fall through a downward path;
means for automatically selecting a container and positioning said container in said path of objects to fill said container;
means for detecting when said container is filled; and
means for moving said filled container to a deposit area.

22. A packaging machine comprising:
a rotatable drum;
a conveying device for loading objects to be packaged into said rotatable drum;
a motive device operably connected to said drum for rotating said drum about a horizontal axis at a speed to cause said objects to first be carried upwardly and then to fall through a downward path;
a staging platform having stations for holding a plurality of variously sized containers;
a withdrawing mechanism for automatically withdrawing a desired container from said staging platform and positioning it in said downward path;
a mechanism for aligning said desired container on said staging platform and said withdrawing mechanism to permit said withdrawing;
a device for determining when said container in said path is filled; and
a moving apparatus for moving said filled container to a deposit area.

23. A packaging machine according to claim 22, wherein said conveying device comprises a first angled member leading from an opening in a side wall of said machine to a second curved chute shaped to funnel said objects downwardly and rearwardly into said drum.

24. A packaging machine according to claim 22, wherein said motive device comprises a motor connected to said drum by means of a connecting belt.

25. A packaging machine according to claim 22, wherein said drum includes a plurality of flights to carry said objects arcuately upwardly and then to release them to fall downwardly.

26. A packaging machine according to claim 22, wherein said staging platform comprises a staging carousel rotatable around a vertical axis, said carousel having stations therein for holding a plurality of stacks of various sized containers, with each stack having a plurality of single sized containers.

27. An automatic packaging machine according to claim 26, wherein said mechanism for aligning comprises detectors for stopping said carousel at a particular angular position to position a desired stack of containers at an unstacking station, and a mechanism at said unstacking station for withdrawing a single container from said desired stack.

28. A packaging machine according to claim 22, wherein said withdrawing mechanism for positioning said selected container in said path comprises an indexing carousel for carrying said selected container into said path.

29. A packaging machine according to claim 22, wherein said device for detecting when said container is filled comprises a capacitive sensor positioned above a top of said container to determine the presence of objects piled above the top of said container.

30. A packaging machine according to claim 22, wherein said apparatus for moving said filled container comprises an indexing carousel.

31. A packaging machine according to claim 22, wherein said apparatus for moving said filled container comprises a lifter mechanism to engage said container and lift it towards said deposit area.

32. A packaging machine according to claim 22, wherein said apparatus for moving said filled container to said deposit area comprises a pair of pivotable arms having a grasping portion designed to engage said container and to carry it to said deposit area.

33. A packaging machine according to claim 22, including a transfer mechanism in said deposit area having a portion for engaging said containers to slide them toward an unoccupied portion of said deposit area.

* * * * *